US010329977B2

(12) United States Patent
Ulrey et al.

(10) Patent No.: US 10,329,977 B2
(45) Date of Patent: Jun. 25, 2019

(54) GASOLINE PARTICLE FILTER TEMPERATURE CONTROL

(71) Applicant: Ford Global Technologies, LLC, Dearborn, MI (US)

(72) Inventors: Joseph Norman Ulrey, Dearborn, MI (US); Emil G. Serban, Ann Arbor, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 15/000,930

(22) Filed: Jan. 19, 2016

(65) Prior Publication Data

US 2017/0204761 A1    Jul. 20, 2017

(51) Int. Cl.
*F01N 3/00* (2006.01)
*F01N 3/023* (2006.01)
*F01N 9/00* (2006.01)
*F02D 13/02* (2006.01)
*F02D 41/00* (2006.01)
*F02D 41/12* (2006.01)
(Continued)

(52) U.S. Cl.
CPC ........... *F01N 3/0235* (2013.01); *F01N 3/021* (2013.01); *F01N 9/002* (2013.01); *F01N 11/002* (2013.01); *F02D 13/0215* (2013.01); *F02D 13/0261* (2013.01); *F02D 41/0005* (2013.01); *F02D 41/123* (2013.01); *F01N 2430/06* (2013.01); *F01N 2560/06* (2013.01); *F01N 2900/1602* (2013.01); *F02D 41/029* (2013.01); *F02D 2041/001* (2013.01); *F02D 2041/002* (2013.01); *F02D 2200/0406* (2013.01); *F02D 2200/0802* (2013.01); *Y02T 10/18* (2013.01); *Y02T 10/20* (2013.01); *Y02T 10/42* (2013.01); *Y02T 10/47* (2013.01)

(58) Field of Classification Search
CPC ...... F01N 3/0235; F01N 9/002; F01N 11/002; F02D 13/0215; F02D 13/0261; F02D 41/0005; F02D 41/123
USPC .......................................................... 60/274
See application file for complete search history.

(56) References Cited

U.S. PATENT DOCUMENTS 8,359,839 B2 *  1/2013  Van Nieuwstadt ........................
                                        F02D 13/0261
                                        60/274
8,407,988 B2    4/2013  Bidner et al.
(Continued)

OTHER PUBLICATIONS

Ulrey, Joseph Norman et al., "Method and System for Maintaining a DFSO," U.S. Appl. No. 14/611,385, filed Feb. 2, 2015, 49 pages.

*Primary Examiner* — Jason D Shanske
(74) *Attorney, Agent, or Firm* — Julia Voutyras; McCoy Russell LLP

(57) ABSTRACT

Methods and systems are provided for controlling particulate filter temperature during non-combustion conditions. In one example, a method for an engine includes responsive to a particulate filter temperature above a threshold temperature and while operating the engine with deceleration fuel shut-off (DFSO), fully closing a throttle valve configured to regulate flow of intake air to the engine, and responsive to intake manifold pressure dropping below a threshold pressure while the throttle valve is fully closed, adjusting a position of the throttle valve based on the particulate filter temperature.

14 Claims, 4 Drawing Sheets

(51) Int. Cl.
  *F01N 11/00*   (2006.01)
  *F01N 3/021*   (2006.01)
  *F02D 41/02*   (2006.01)

(56) References Cited

U.S. PATENT DOCUMENTS

| | | | |
|---|---|---|---|
| 8,464,514 B2 | 6/2013 | Kems et al. | |
| 8,499,549 B2 * | 8/2013 | Herges | F01N 1/165 |
| | | | 123/323 |
| 2009/0018751 A1 | 1/2009 | Buckland et al. | |
| 2010/0070122 A1 * | 3/2010 | Niimi | B60K 6/445 |
| | | | 701/22 |
| 2011/0224887 A1 | 9/2011 | Mueller | |
| 2013/0008162 A1 * | 1/2013 | Ruona | F01N 3/023 |
| | | | 60/605.1 |
| 2014/0202437 A1 | 7/2014 | Surnilla et al. | |
| 2015/0275773 A1 * | 10/2015 | Huang | F02D 29/02 |
| | | | 701/104 |
| 2017/0044998 A1 * | 2/2017 | Holub | F02D 9/02 |

* cited by examiner

GASOLINE PARTICLE FILTER TEMPERATURE CONTROL

FIELD

The present description relates generally to methods and systems for reducing airflow to a gasoline particle filter while extending deceleration fuel shut-off time of an engine.

BACKGROUND/SUMMARY

The fuel consumption of automotive engines may be improved by shutting off fuel delivery into an engine when a vehicle is decelerating. This is known as deceleration fuel shut-off (DFSO). However, during DFSO the delivery of oxygen into an emissions control device of the vehicle increases. In vehicles that include a particulate filter, this increased oxygen delivery may result in degradation of the filter due to the overheating of the filter.

U.S. Pat. No. 8,407,988 offers a method to reduce the flow of oxygen to the particle filter during non-combustion conditions by closing an intake throttle valve. However, the inventors herein have recognized an issue with the above approach. As the engine continues to rotate with the intake throttle valve closed, the intake manifold air pressure (MAP) begins to drop. If the MAP gets too low, engine degradation may occur, e.g., lubricants may be drawn into the combustion chamber.

Accordingly, the inventors herein provide an approach to at least partially address these issues. In one example, a method includes, in response to a determination that a particle filter has reached a temperature above a threshold while an engine is operating with deceleration fuel shut-off (DFSO), fully closing a throttle valve configured to regulate flow of intake air to the engine, and responsive to intake manifold pressure dropping below a threshold pressure while the throttle valve is fully closed, adjusting a position of the throttle valve based on the particulate filter temperature.

In this way, particulate filter temperature during DFSO may be maintained below a threshold temperature, thus preventing filter degradation and extending the length of operation of DFSO. If the MAP drops below a threshold pressure while the throttle valve is closed, the throttle valve position may be adjusted based on filter temperature. For example, if the filter temperature is above the threshold temperature yet below an upper limit threshold, the throttle valve may be open by a small, preset amount. However, if the temperature of the particle filter increases above the upper limit threshold to the throttle may be maintained fully closed and MAP may be controlled by adjusting intake and/or exhaust valve timing to increase the overlap between the intake and exhaust valves of an engine's cylinders in order to increase the manifold pressure. In doing so, the MAP may be increased while maintaining restricted airflow into the particle filter, and in this way help decrease the temperature of the particle filter, while the engine remains in DFSO mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for maintaining an engine in decelerating fuel shut-off (DFSO) mode while keeping a gasoline particle filter from overheating. Some internal combustion engines employ a particulate filter in an exhaust system to trap particulate matter flowing through the exhaust system and thereby meet emission standards. For example, a direct-injection spark-ignition engine may include a particle filter to trap soot. As particulate matter accumulates in a particulate filter, exhaust backpressure will increase, which can adversely affect fuel economy. Accordingly, a particulate filter may be periodically regenerated by oxidizing stored particulate matter. A regeneration reaction typically includes increased oxygen concentration at the filter and suitable temperature conditions. As more oxygen is supplied to the filter, the heat produced by the combustion of the soot particles trapped by the filter may increase the temperature of the filter. Eventually, the filter may overheat.

When the temperature of the particle filter approaches a point at which the filter may be at risk of degradation, the filter may be cooled down by inhibiting the combustion reaction. This reaction may be inhibited by interrupting the supply of oxygen to the particle filter. Normally, an engine utilizes a significant amount of oxygen during the combustion of fuel at the engine's cylinders. However, when an engine is in DFSO mode fuel delivery to the engine is suspended, therefore no oxygen is consumed at the cylinders and it is eventually routed to the particle filter. Under these circumstances it is more difficult to control the temperature of the filter. In some examples, DFSO may be suspended and fuel delivery to the engine may be resumed, resulting in the reduction of oxygen supply to the particle filter and the subsequent decrease in the temperature of the filter. However, premature suspension of DFSO may decrease fuel efficiency.

The disclosed method attempts to extend the time an engine operates in DFSO mode while keeping the particle filter from overheating. In one embodiment, once an engine controller determines that the gasoline particle filter may have reached a threshold temperature, the intake throttle may be adjusted to a minimum position, which in one example may be fully closed. The effect of completely closing the throttle is to suspend the flow of additional oxygen into the particle filter in order to inhibit the soot combustion reaction, which may then result in the lowering of the temperature of the filter. Further, if the air pressure of the intake manifold decreases below a threshold while the throttle is at its minimum position, the timing of the intake and exhaust valves of the engine's cylinders may be adjusted to increase valve overlap. In this way, the manifold pressure may be increased while maintaining the engine operation in DFSO conditions.

Figure 1:
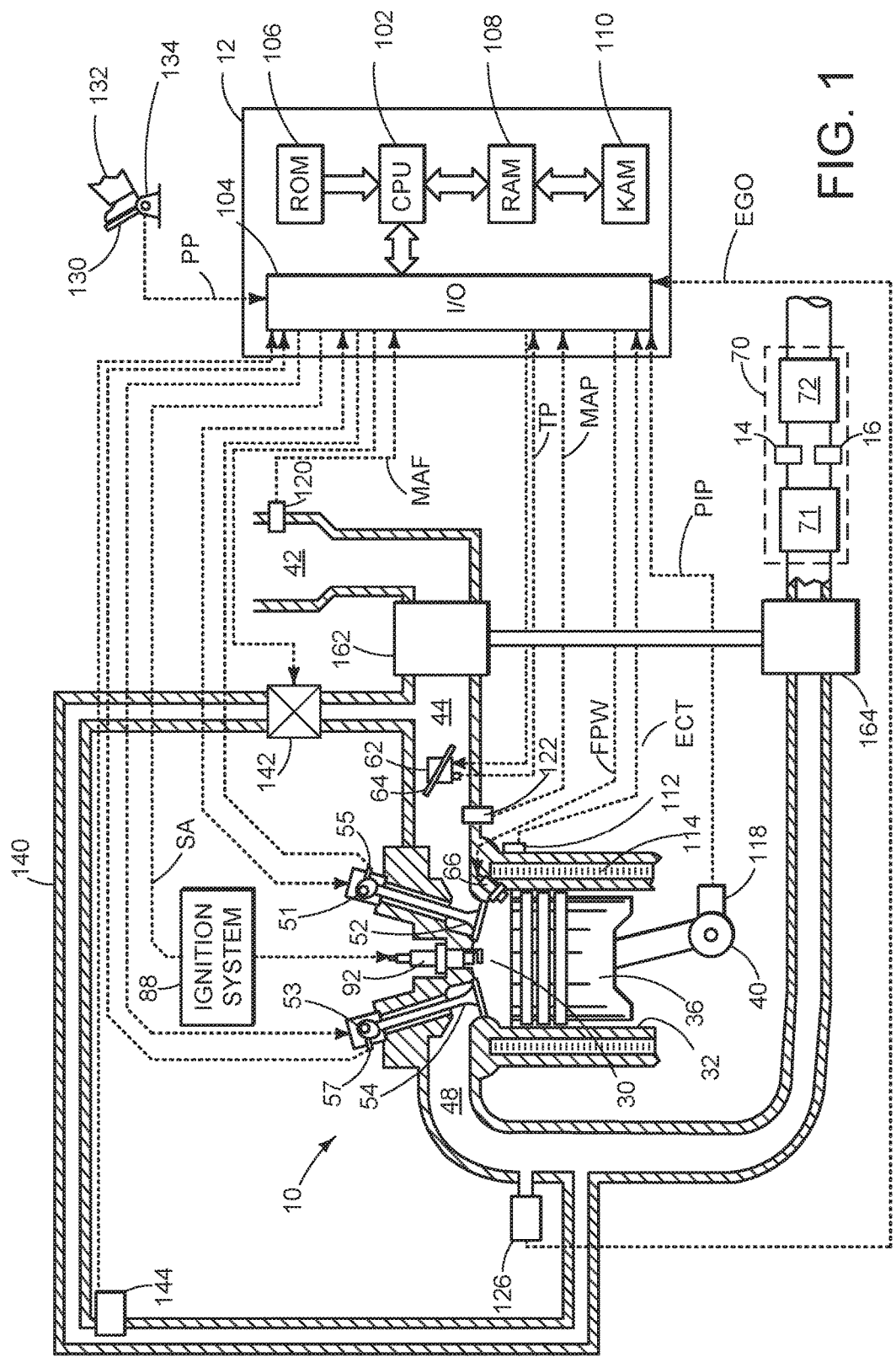
FIG. 1 shows a schematic diagram of a combustion chamber of an internal combustion engine.
Figure 2:
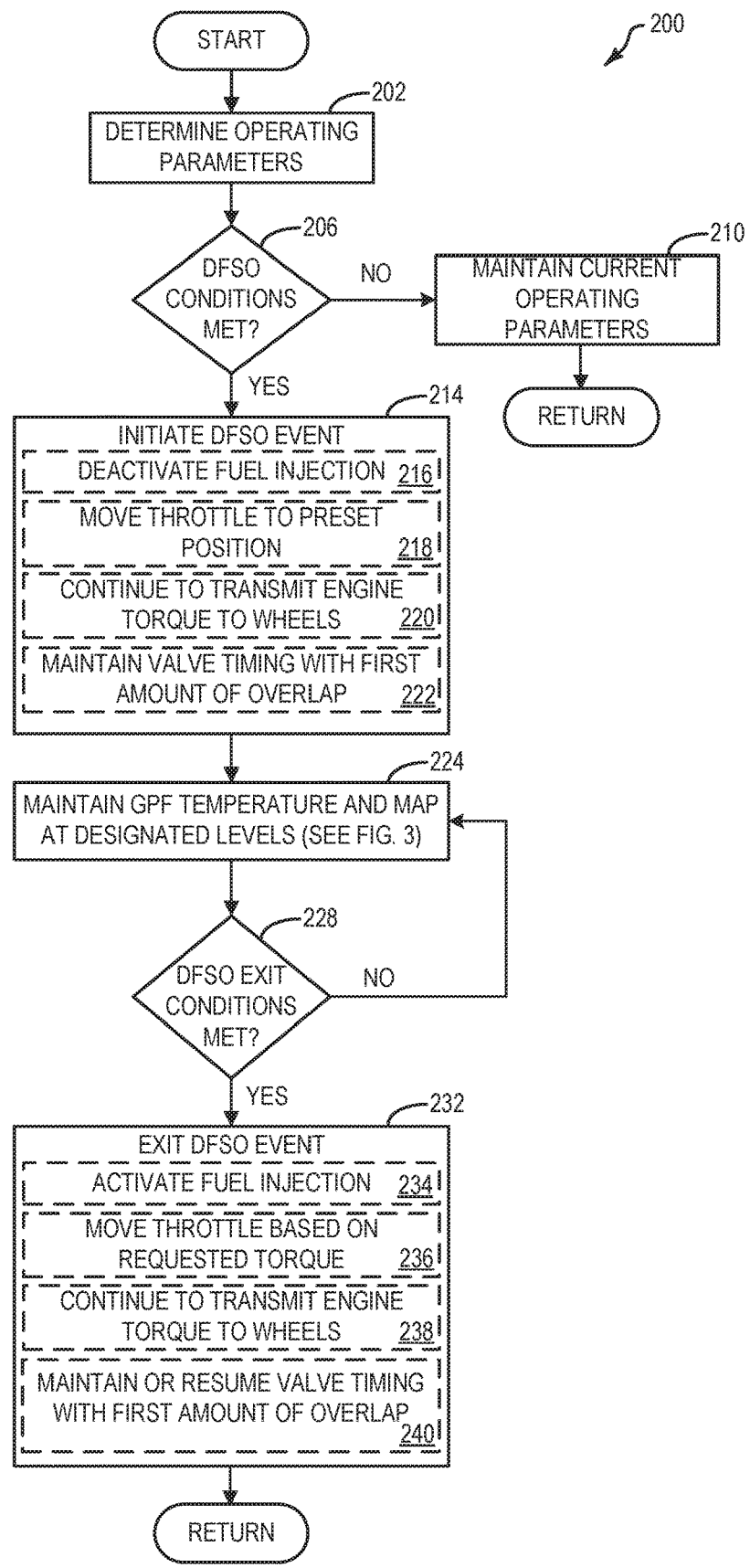
FIG. 2 shows a flowchart illustrating a method for controlling the decelerating fuel shut-off parameters of an engine.
Figure 3:
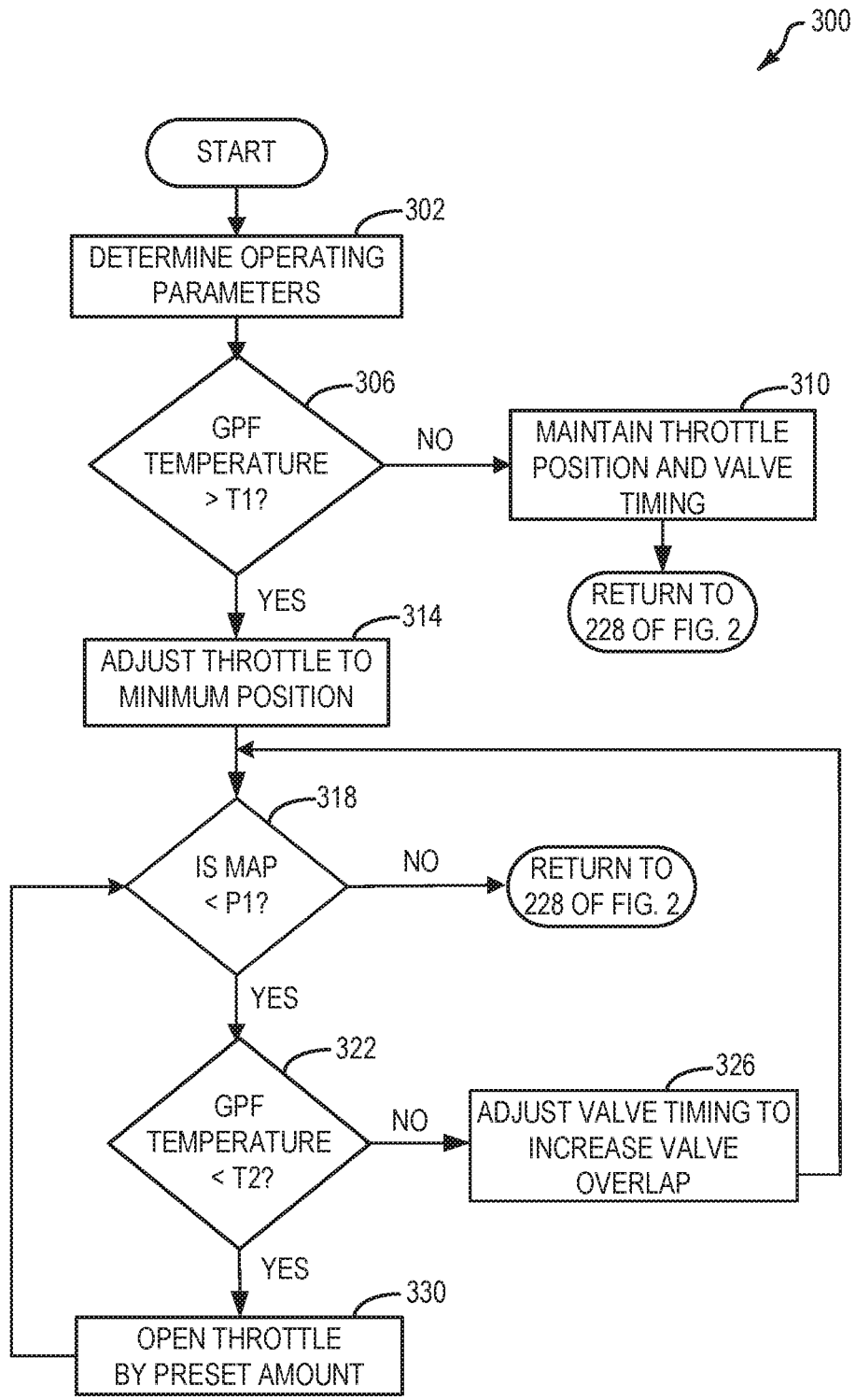
FIG. 3 shows a flowchart illustrating a method for keeping a gasoline particle filter from overheating while an engine is in decelerating fuel shut-off mode.
Figure 4:
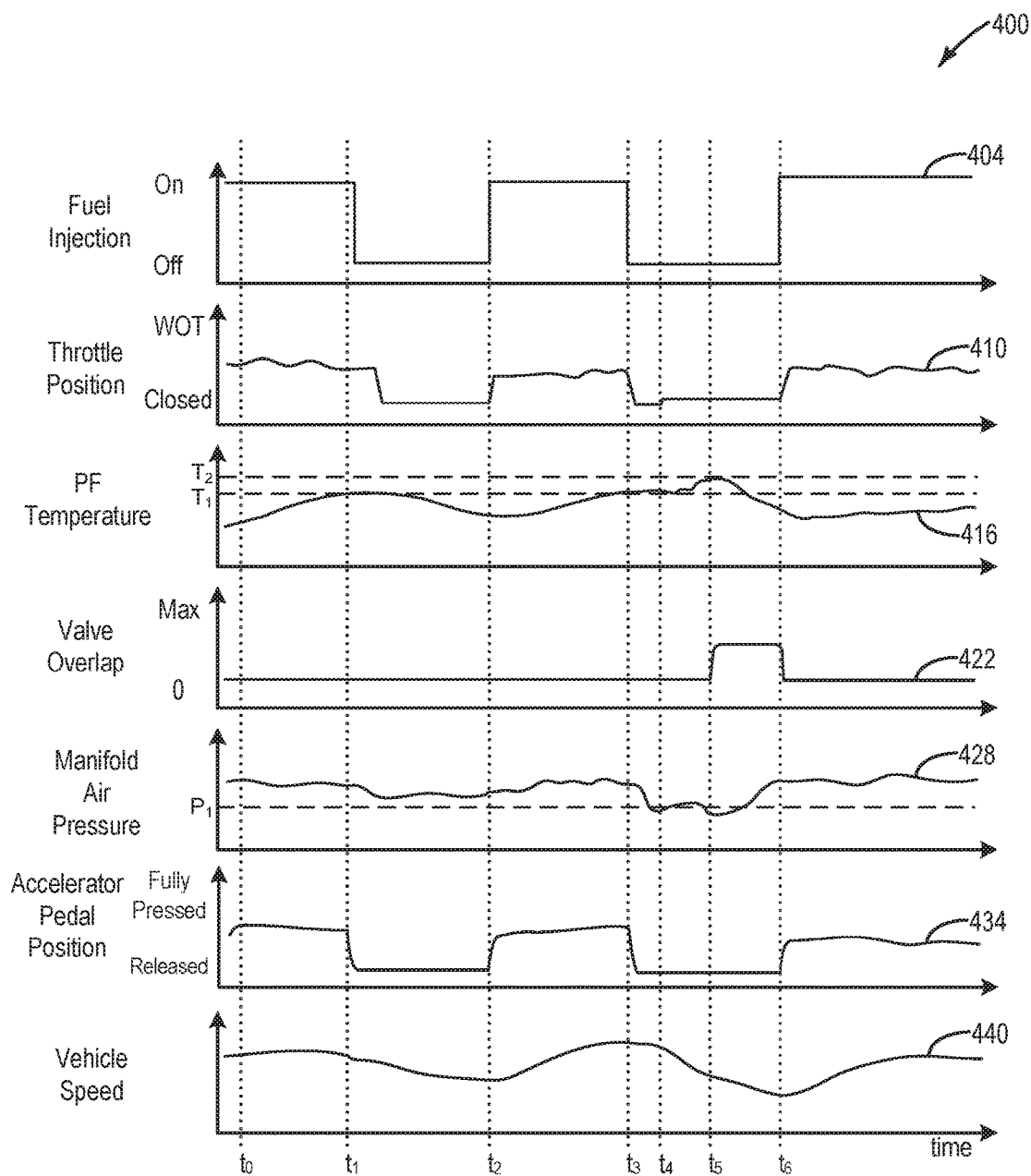
FIG. 4 shows an example timeline for controlling the temperature of a gasoline particle filter according to the methods of FIGS. 2 and 3.

FIG. 1 displays a schematic diagram showing one cylinder of a multi-cylinder engine fitted with an emissions control device that includes a gasoline particle filter. The flowchart presented in FIG. 2 illustrates a method for controlling the decelerating fuel shut-off (DFSO) operation of an engine. A flowchart illustrating a method to control the temperature of the gasoline particle filter is shown in FIG. 3 that describes the adjustment of the throttle valve and the degree of overlap of the intake and exhaust valves while an engine is operating in decelerating fuel shut-off mode. FIG. 4 shows an example timeline for several engine operating parameters under a variety of engine conditions, including operation at times under normal conditions and at others under DFSO conditions. While the engine is under DFSO conditions, in one example, the engine throttle valve is adjusted in response to overheating of the particle filter, and in a second example, both the throttle valve and the cam timing valve overlap are adjusted to control the temperature of the particle filter.

The schematic diagram in FIG. 1 illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust $O_2$ sensor and/or an intake oxygen sensor (intake manifold). Under some conditions, the EGR system may be used to regulate the temperature of the air and fuel mixture within the combustion chamber and/or the temperature proximate PF 72. While FIG. 1 shows a high pressure EGR system, a low pressure EGR system may additionally, or alternatively, be used. In a low pressure EGR system, EGR may be routed from downstream of a turbine of a turbocharger to upstream of a compressor of the turbocharger.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 1, one or more of these sensors may be omitted and/or moved.

ECD 70 is shown arranged along exhaust passage 48 downstream of exhaust gas sensor 126. In this example, ECD 70 includes a three-way catalyst (TWC) 71 and a particulate filter (PF) 72. In some embodiments, PF 72 may be located downstream of the TWC 71 (as shown in FIG. 1), while in other embodiments, PF 72 may be positioned upstream of the catalyst (not shown in FIG. 1). Further, PF 72 may be arranged between two or more three-way catalysts, or other emission control devices (e.g., selective catalytic reduction system, NOx trap) or combinations thereof. In other embodiments, TWC 71 and PF 72 may be integrated in a unitary housing. Further, while PF 72 is shown in FIG. 1 as being positioned downstream of the turbine 164 and HP-EGR passage inlet, in some examples PF 72 may be positioned upstream of one or both of the turbine EGR passage inlet. In still further examples, the engine may not include a turbocharger or an EGR system.

Controller 12 is shown in FIG. 1 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from sensor 122. Engine speed signal, RPM, may be generated by controller 12 from signal PIP. Manifold pressure signal MAP from the manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor 102 for performing the methods described herein, as well as other variants that are anticipated but not specifically listed. The controller 12 receives signals from the various sensors (e.g., manifold air pressure sensor 122, valve position sensors 55 and 57, temperature sensor 16) of FIG. 1 and employs the various actuators (e.g., throttle plate 64, cam actuation systems 51 and 53) of FIG. 1 to adjust engine operation based on the received signals and instructions stored on a memory of the controller.

An engine may shift to deceleration fuel shut-off (DFSO) under a variety of circumstances, such as when the operator reduces vehicle speed, or when the vehicle is coasting. The disclosed method incorporates existing mechanisms that determine the suitability of shifting an engine to DFSO mode. When in DFSO mode, the delivery of fuel to the engine is deactivated, resulting in increased fuel economy, while the engine continues to rotate as it transmits torque to the wheels. The intake and exhaust valves of the cylinders may continue to be actuated with normal timing (e.g. the same timing used prior to entry into DFSO). The disclosed method monitors the temperature of the gasoline particle filter and may adjust the throttle to a minimum position if the temperature of the filter reaches a first threshold. In another example, if the manifold air pressure (MAP) falls below a threshold and the temperature of the filter is above a second threshold, the method may adjust intake and/or exhaust valve timing (e.g., the cam timing mechanism may be adjusted) to increase the overlap of the intake and exhaust valves, thus increasing MAP.

FIG. 2 illustrates a method 200 for controlling DFSO operation of an engine, such as engine 10 of FIG. 1. Instructions for carrying out method 200 and the rest of the methods included herein may be executed by a controller (e.g., controller 12) based on instructions stored on a memory of the controller and in conjunction with signals received from sensors of the engine system, such as the sensors (e.g., sensor 122) described above with reference to FIG. 1. The controller may employ engine actuators (e.g., throttle 62) of the engine system to adjust engine operation, according to the methods described below.

Method 200 includes, at 202, determining engine operating parameters including engine speed and load, MAP and MAF, engine and/or manifold temperature, driver requested torque, particulate filter temperature and/or load, etc. At 206, method 200 determines if the conditions are met for the engine to be adjusted into DFSO mode. This estimation may include conditions such as an operator requested deceleration, e.g., speed reduction, or the operator ceasing to depress the accelerator pedal to allow the vehicle to coast at the attained speed. If at 206 method 200 determines that DFSO conditions have not been met, it may proceed to 210. At 210, current engine operating parameters are maintained, e.g., fuel injection, throttle position, engine torque transmission to the wheels, and valve timing may be maintained at current settings as determined by the engine controller and/or the request of an operator. Method 200 may return.

If at 206, method 200 determines that DFSO is indicated, a DFSO event may be initiated at 214. Fuel injectors (such as fuel injector 66) may be deactivated at 216 and a throttle (e.g., throttle 62) may be adjusted to a preset position at 218. The preset position may be a suitable position the throttle is positioned to when DFSO is activated, and may include at least partially open in one example. In other examples, the preset position of the throttle may be fully closed. At 220 the engine may continue to transmit torque to the wheels, while at 222 the overlap timing of an intake valve (e.g., intake valve 52) and a corresponding exhaust valve (e.g., exhaust valve 54) may be maintained at a first amount of overlap, which may be the amount of overlap before the engine entered into DFSO mode. While in DFSO mode an engine may continue to rotate and flow air out of the cylinders (e.g., cylinder 30) through an exhaust manifold (such as exhaust manifold 48). This air may flow into a particle filter (such as particle filter 72).

At 224, method 200 maintains the temperature of the particle filter and the air pressure of an intake manifold (e.g., intake manifold 44) at respective designated levels, as will be explained in more detail below with respect to FIG. 3. Briefly, the particulate filter may be maintained below a threshold temperature by closing the throttle valve during DFSO, and if the closure of the throttle valve causes MAP to drop below a threshold pressure, the throttle valve may be adjusted and/or valve timing may be adjusted.

At 228, method 200 determines if DFSO exit conditions are met. DFSO exit conditions may include the accelerator pedal being depressed and/or other conditions. If DFSO exit conditions have not been met, method 200 may proceed back to 224, in which case method 200 may continue to operate in DFSO and maintain particulate filter temperature and MAP at designated levels until DFSO exit conditions have been met, e.g., the operator of the vehicle resumes acceleration. If at 228 method 200 determines that DFSO exit is indicated, method 200 proceeds to 232. At 232 a DFSO exit event may be initiated, and the pertinent parameters may be returned to normal operating conditions, including activating fuel injection at 234 and adjusting the throttle valve based on requested torque at 236. In one example, the requested torque may include operator-requested torque. Additionally or alternatively, the requested torque may include vehicle-requested torque, such as an alternator load applied to the engine. At 238 the engine may continue to transmit torque to the wheels, a torque that may be adjusted according to the request of the vehicle operator. At 240, while the engine is rotating the timing of the intake and exhaust valves may be maintained at or resumed to the first amount of overlap, e.g., the overlap the valves had before they entered into DFSO mode. Method 200 may return.

FIG. 3 illustrates a method 300 for maintaining the temperature of a particle filter (such as particle filter 72) and the air pressure of an intake manifold (e.g., intake manifold 44) while an engine is operating in DFSO mode. Method 300 may be executed as part of method 200, for example in response to operation in DFSO. At 302, method 300 determines engine operating parameters, which may include engine speed and load, MAP, particle filter temperature, throttle valve position, etc. At 306 method 300 determines if the particle filter temperature is above a first threshold temperature $T_1$ based on output from a particulate filter temperature sensor, such as sensor 16 of FIG. 1, or based on an estimated particulate filter temperature. The threshold temperature $T_1$ may be as suitable temperature that indicates particulate filter degradation is likely to occur if relatively high levels of oxygen are provided to the filter. In one example, the threshold $T_1$ may be the temperature at which soot typically burns, such as 500° C. In some examples, the first threshold temperature $T_1$ may vary based on the soot load of the particulate filter, e.g., the threshold temperature may increase with decreasing soot load.

If it is determined that the temperature is below $T_1$, method 300 may proceed to 310. At 310 a throttle valve (such as throttle 62) position and the amount of overlap of an intake valve (such as intake valve 52) and a corresponding exhaust valve (e.g., exhaust valve 54) may be maintained at their current DFSO levels, e.g., those corresponding to 214 of method 200 of FIG. 2. In such a case, the engine may loop back to 228 of FIG. 2 to continue operating in DFSO mode, as described above for method 200.

If at 306 method 300 determines that the particle filter temperature has exceeded temperature $T_1$, it may proceed to 314. At 314, method 300 may adjust the throttle to a minimum position, in one example, to a fully closed position. By fully closing the throttle the flow of oxygen to the particle filter may be interrupted, which in turn may result in its temperature decreasing or may prevent the temperature from increasing.

At 318, method 300 determines if the intake manifold pressure is below a threshold pressure, based on output from a MAP sensor, such as sensor 122 of FIG. 1. The threshold pressure may be a pressure below which engine degradation may occur due to lubricating fluid being pulled into the combustion chambers, for example. In one example, the threshold MAP may be 30 kPa absolute, although other threshold pressures are possible. If the MAP is not below the threshold pressure, method 300 loops back to 228 of FIG. 2 to continue to operate in DFSO and monitor for DFSO exit conditions.

If the MAP is less than the threshold pressure, method 300 proceeds to 322 to determine if the particulate filter temperature is less than a second threshold temperature, T2. The second threshold temperature may be greater than the first threshold temperature, and may represent an upper limit temperature at which degradation of the particulate filter may occur. In one example, the second threshold temperature may be 600° C. If the particulate filter temperature is not below the second threshold temperature, method 300 proceeds to 326 to adjust intake and/or exhaust valve timing to increase the amount of valve overlap. By increasing valve overlap, the MAP may be increased. To increase valve overlap, the timing of the closing the exhaust valves may be adjusted, the timing of the opening of the intake valves may be adjusted, or both the timing of the exhaust valves and the timing of the intake valves may be adjusted. The valve timing may be adjusted by adjusting a variable camshaft timing system, variable valve lift system, or other suitable mechanism. Method 300 then proceeds back to 318 to continue to assess the MAP and particulate filter temperature.

If it is determined at 322 that the particulate filter temperature is below the second threshold temperature, method 300 proceeds to 330 to open the throttle valve by a preset amount. In one example, the preset amount may be one degree, although other amounts are possible. By opening the throttle by a relatively small amount, the MAP may be increased without directing too much oxygen to the particulate filter. Method 300 then loops back to 318 to continue to monitor MAP and particulate filter temperature.

Thus, method 300 monitors particulate filter temperature during DFSO or other non-combustion operation. If the DFSO temperature is relatively high, the throttle valve is closed to prevent the flow of oxygen to the particulate filter, and thus prevent the combustion of the soot in the particulate filter. However, closing of the throttle valve during DFSO may cause intake manifold pressure to drop below a threshold pressure, which may result in engine degradation. To prevent intake manifold pressure from becoming too low, the temperature of the particulate filter may be assessed. If the particulate filter temperature is below an upper limit temperature at which degradation to the filter may occur, the throttle valve may be opened slightly (e.g., by one degree) to increase MAP without directing excess oxygen to the particulate filter. However, if the particulate filter is at or above the upper limit temperature, even a small amount of oxygen may cause filter degradation. Thus, to increase MAP, the intake and/or exhaust valves may adjusted to increase valve overlap, while the throttle valve remains fully closed. Once conditions for exiting out of DFSO are met, the throttle valve may be returned to a position based on operator-requested torque and valve timing may revert back to pre-DFSO valve timing.

Turning now to FIG. 4, a diagram 400 illustrating operating plots of interest during execution of the methods 200 and/or 300 described above is illustrated. Diagram 400 illustrates fuel injection status (as shown by curve 404), throttle position (as shown by curve 410), particulate filter temperature (as shown by curve 416), intake and exhaust valve overlap (as shown by curve 422), intake manifold pressure (as shown by curve 428), accelerator pedal position (as shown by curve 434), and vehicle speed (as shown by curve 440). For each operating plot, time is depicted along the horizontal axis and respective values for each parameter are depicted along the vertical axis.

Prior to time t1, the vehicle is operating under standard, non-DFSO conditions. As such, fuel injection is on, the throttle is controlled based on operator-requested torque and is kept partially open, the particulate filter temperature is relatively low (below the first threshold temperature T1), valve overlap is at an amount based on operating parameters (as shown, valve overlap is relatively low), MAP is above the threshold pressure P1, the accelerator pedal is partially depressed, and the vehicle speed is maintained at a desired speed. At time t1, the operator releases the accelerator pedal, as shown by curve 434, due to traversal of a declined road surface, for example, and vehicle speed starts to moderately decelerate. Due to the deceleration, combustion is not indicated to maintain desired vehicle speed, and thus fuel injection is shut off, as shown by curve 404.

Once the fuel injection is disabled, the throttle may initially assume a predetermined position, such as partially open. However, due to the particulate filter reaching the first threshold temperature at time t1, the throttle is subsequently fully closed to prevent particulate filter degradation. Because MAP is maintained above the threshold pressure P1, the throttle is kept fully closed and valve overlap is not adjusted for the duration of the DFSO event.

At time t2, the operator depresses the accelerator pedal, and thus the vehicle exits out of DFSO by resuming fuel injection. The throttle is controlled based on operator requested torque and as such moves out of the fully closed position. Due to the lack of hot exhaust and oxygen being supplied to the particulate filter during DFSO, the particulate filter temperature has dropped below the first threshold temperature, although it beings to rise again following time t2.

At time t3, another DFSO event is initiated, where fuel injection is disabled due to vehicle deceleration/release of the accelerator pedal. The throttle is moved to the fully closed position due to the particulate filter temperature being at the first threshold temperature. However, unlike the first DFSO event, at time t4 the MAP drops to below the threshold pressure. To increase MAP, because the particulate filter temperature is below the second threshold temperature, the throttle is opened by a small amount. However, the opening of the throttle results in the particulate filter temperature increasing to the second threshold temperature at time t5. Further, while the opening of the throttle valve at time t4 caused an increase in MAP initially, the MAP again drops to below the threshold pressure at time t5. Thus, to increase MAP, the valve timing is adjusted to increase the amount of valve overlap at time t5.

At time t6, the operator again depresses the accelerator pedal, and as a result the vehicle exits out of DFSO by activating fuel injection, opening the throttle and controlling throttle position based on requested torque, and reducing the amount of valve overlap back to the pre-DFSO amount of overlap.

In this way, by hard closing of the throttle in DFSO, a much slower rise in particulate filter temperature occurs, allowing for longer DFSO events, thus increasing fuel economy. MAP may be controlled based on particulate filter temperature, such that MAP is increased by slightly opening the throttle if particulate temperature is not too high or MAP is increased by increasing valve overlap if particulate temperature is too high. While closing the throttle during DFSO may prevent particulate filter overtemperature events, in some conditions the particulate filter may still reach the threshold temperature. In such circumstances, the vehicle may exit out of DFSO to prevent filter degradation.

Closing the throttle during DFSO may also improve consistency for fuel-off exhaust flow. The throttle flow may not be impacted by other strategy features that might be enacted to increase the airflow in anticipation of the fuel being restored, such as A/C and alternator loads. For example, when it is predicted that the vehicle will exit out of DFSO, auxiliary loads may be applied to the engine to increase engine power. If the throttle is closed when the loads are applied, the throttle may be opened to allow airflow increase in order to generate the additional engine power.

The technical effect of closing the throttle during DFSO and controlling MAP based on particulate filter temperature is to prevent particulate filter degradation during DFSO while extending the duration of DFSO, thus improving fuel economy while maintaining MAP above a threshold pressure.

As one embodiment, a method for an engine includes, responsive to a particulate filter temperature above a threshold temperature and while operating the engine with deceleration fuel shut-off (DFSO), fully closing a throttle valve configured to regulate flow of intake air to the engine; and responsive to intake manifold pressure dropping below a threshold pressure while the throttle valve is fully closed, adjusting a position of the throttle valve based on the particulate filter temperature. In a first example of the method, adjusting the position of the throttle valve based on the particulate filter temperature comprises, when the particulate filter temperature is above the threshold temperature and below a second, higher threshold temperature, opening the throttle valve by a predetermined amount to increase intake manifold pressure. A second example of the method optionally includes the first example and further includes wherein adjusting the position of the throttle valve based on the particulate filter temperature comprises, when the particulate filter temperature is above the second threshold temperature, maintaining the throttle valve fully closed and adjusting intake and exhaust valve timing to increase intake manifold pressure. A third example of the method optionally includes one or both of the first and second examples and further includes wherein adjusting intake and exhaust valve timing comprises increasing intake and exhaust valve overlap. A fourth example of the method optionally includes one or more or each of the first through third examples and further includes wherein operating the engine with DFSO comprises transmitting engine output to vehicle wheels via a transmission, and deactivating fuel injection to the engine during a deceleration condition of a vehicle in which the engine is installed. A fifth example of the method optionally includes one or more or each of the first through fourth examples and further includes responsive to the particulate filter temperature being below the threshold temperature while the engine is operating in DFSO, maintaining the throttle valve at a fully open or partially open position. A sixth example of the method optionally includes one or more or each of the first through fifth examples and further includes responsive to a request to exit out of operation with DFSO, activating fuel injection to the engine and adjusting a position of the throttle valve based on requested torque. A seventh example of the method optionally includes one or more or each of the first through sixth examples and further includes wherein adjusting a position of the throttle valve based on requested torque comprises adjusting a position of the throttle valve based on operator-requested torque. An eighth example of the method optionally includes one or more or each of the first through seventh examples and further includes wherein adjusting a position of the throttle valve based on requested torque comprises adjusting a position of the throttle valve based on vehicle-requested torque including one or more auxiliary loads placed on the engine. A ninth example of the method optionally includes one or more or each of the first through eighth examples and further includes, prior to exiting out of operation with DFSO, increasing one or more auxiliary loads placed on the engine and opening the throttle valve responsive to a predicted subsequent exit out of operation with DFSO.

An embodiment of a system includes an engine including a plurality of cylinders, each cylinder including at least one intake valve and at least one exhaust valve; a throttle valve controlling flow of intake air to the engine; a particulate filter coupled to the engine via an exhaust passage; and a controller having computer readable instructions stored on non-transitory memory for: initiating a deceleration fuel shut-off (DFSO) event during a vehicle deceleration event by deactivating a fuel supply to the plurality of cylinders of the engine; closing the throttle valve responsive to initiating the DFSO event; and when an intake manifold pressure of the engine drops below a threshold pressure, adjusting intake and/or exhaust valve timing based on a temperature of the particulate filter. In a first example of the system, adjusting intake and/or exhaust valve timing based on a temperature of the particulate filter comprises adjusting intake and/or exhaust valve timing to increase valve overlap when the temperature of the particulate filter is above a threshold temperature. A second example of the system optionally includes the first example and further includes wherein the valve overlap is increased relative to an amount of valve overlap prior to initiating of the DFSO event. A third example of the system optionally includes one or more or each of the first and second examples and further includes wherein the controller has further instructions for opening the throttle valve by a predetermined amount when the intake manifold pressure is below the threshold pressure and the temperature of the particulate filter is below the threshold temperature. A fourth example of the system optionally includes one or more or each of the first through third examples and further includes wherein the controller has further instructions for, responsive to a request to exit of DFSO, opening the throttle valve and reactivating the fuel supply. A fifth example of the system optionally includes one or more or each of the first through third examples and further includes wherein the fuel supply to the plurality of cylinders of the engine comprises a direct-injection gasoline fuel supply.

An embodiment of a method for an engine includes initiating a deceleration fuel shut-off (DFSO) event by deactivating fuel injection to the engine and moving a throttle valve coupled upstream of the engine to a preset, at least partially open position; responsive to a particulate filter temperature above a threshold temperature, fully closing the throttle valve; and maintaining intake manifold pressure above a threshold pressure by adjusting intake and/or exhaust valve timing. In a first example of the method, the method further comprises prior to initiating the DFSO event, operating with a first amount of intake and exhaust valve overlap, and wherein adjusting intake and/or exhaust valve timing comprises adjusting intake and/or exhaust valve timing to operate with a second amount of intake and exhaust valve overlap. A second example of the method optionally includes the first example and further includes wherein fully closing the throttle valve comprises fully closing the throttle valve while maintaining operation with the first amount of intake and exhaust valve overlap. A third example of the method optionally includes one or more or each of the first and second examples and further includes responsive to a request to exit out of the DFSO event, activating fuel injection, adjusting the throttle valve based on operator requested torque, and adjusting intake and/or exhaust valve timing to operate with the first amount of intake and exhaust valve overlap.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   responsive to a particulate filter temperature above a threshold temperature and while operating the engine with deceleration fuel shut-off (DFSO), fully closing a throttle valve configured to regulate flow of intake air to the engine; and
   responsive to intake manifold pressure dropping below a threshold pressure while the throttle valve is fully closed, adjusting a position of the throttle valve based on the particulate filter temperature.

2. The method of claim 1, wherein adjusting the position of the throttle valve based on the particulate filter temperature comprises, when the particulate filter temperature is above the threshold temperature and below a second, higher threshold temperature, opening the throttle valve by a predetermined amount to increase intake manifold pressure.

3. The method of claim 2, wherein adjusting the position of the throttle valve based on the particulate filter temperature comprises, when the particulate filter temperature is above the second threshold temperature, maintaining the throttle valve fully closed and adjusting intake and exhaust valve timing to increase intake manifold pressure.

4. The method of claim 3, wherein adjusting intake and exhaust valve timing comprises increasing intake and exhaust valve overlap.

5. The method of claim 1, wherein operating the engine with DFSO comprises transmitting engine output to vehicle wheels via a transmission, and deactivating fuel injection to the engine during a deceleration condition of a vehicle in which the engine is installed.

6. The method of claim 1, further comprising, responsive to the particulate filter temperature being below the threshold temperature while the engine is operating in DFSO, maintaining the throttle valve at a fully open or partially open position.

7. The method of claim 1, further comprising, responsive to a request to exit out of operation with DFSO, activating fuel injection to the engine and adjusting the positon of the throttle valve based on requested torque.

8. The method of claim 7, wherein adjusting the position of the throttle valve based on requested torque comprises adjusting the positon of the throttle valve based on operator-requested torque.

9. The method of claim 7, wherein adjusting the position of the throttle valve based on requested torque comprises adjusting the positon of the throttle valve based on vehicle-requested torque including one or more auxiliary loads placed on the engine.

10. The method of claim 9, further comprising, prior to exiting out of operation with DFSO, increasing the one or more auxiliary loads placed on the engine and opening the throttle valve responsive to a predicted subsequent exit out of operation with DFSO.

11. A method for an engine, comprising:
    initiating a deceleration fuel shut-off (DFSO) event by deactivating fuel injection to the engine and moving a throttle valve coupled upstream of the engine to a preset, at least partially open position;
    responsive to a particulate filter temperature above a threshold temperature, fully closing the throttle valve; and
    maintaining intake manifold pressure above a threshold pressure by adjusting intake and/or exhaust valve timing.

12. The method of claim 11, further comprising, prior to initiating the DFSO event, operating with a first amount of intake and exhaust valve overlap, and wherein adjusting the intake and/or exhaust valve timing comprises adjusting the intake and/or exhaust valve timing to operate with a second amount of intake and exhaust valve overlap.

13. The method of claim 12, wherein fully closing the throttle valve comprises fully closing the throttle valve while maintaining operation with the first amount of intake and exhaust valve overlap.

14. The method of claim 12, further comprising, responsive to a request to exit out of the DFSO event, activating fuel injection, adjusting the throttle valve based on operator requested torque, and adjusting the intake and/or exhaust valve timing to operate with the first amount of intake and exhaust valve overlap.

* * * * *